United States Patent [19]

McArthur, deceased

[11] Patent Number: 4,628,420
[45] Date of Patent: Dec. 9, 1986

[54] WATER ACTIVATED ELECTRIC CELL AND SURVIVAL LAMP SYSTEM

[75] Inventor: David T. McArthur, deceased, late of Lake Elsinore, Calif., by Donald E. Guilliams, executor

[73] Assignee: Beverly Safford, Yucaipa, Calif.

[21] Appl. No.: 537,818

[22] Filed: Sep. 30, 1983

[51] Int. Cl.[4] .............................................. F21L 7/00
[52] U.S. Cl. ...................................... 362/208; 429/118
[58] Field of Search ............... 362/157, 202, 205, 206, 362/208; 429/118, 119

[56] References Cited

U.S. PATENT DOCUMENTS

| | | | |
|---|---|---|---|
| 2,070,818 | 2/1937 | Winckler | 362/208 |
| 2,790,893 | 4/1957 | Lane | 429/119 |
| 2,794,904 | 6/1957 | Salauze | 429/118 |
| 3,647,550 | 3/1972 | Kober et al. | 429/118 |
| 4,005,246 | 1/1977 | Schiffer et al. | 429/118 |

Primary Examiner—Craig R. Feinberg

Attorney, Agent, or Firm—Albert L. Gabriel

[57] ABSTRACT

A deferred action electric cell of the type having a magnesium anode and a silver halide cathode, wherein the electrolyte is supported in dried form intermediate the electrodes for rapidly developing full electrical potential upon the addition of any aqueous fluid, even fresh water. A novel method of coating the magnesium anode utilizing a detergent bath produces a coating that prevents corrosive deterioration of the magnesium from handling and from close proximity of the dried electrolyte, for an extended shelf life. One form of survival lamp embodying the cell utilizes the tubular magnesium anode as the body of the lamp, with a light bulb seated in one end thereof and the other end open for introduction of activating water; while another form adapted to be dropped into a body of water as a floating signal light has the cell sealed inside of a can-like cylindrical container having a light-transmitting dome at the top and a bottom adapted to be torn out along a tear line to expose the cell prior to dropping the unit into the water.

16 Claims, 12 Drawing Figures

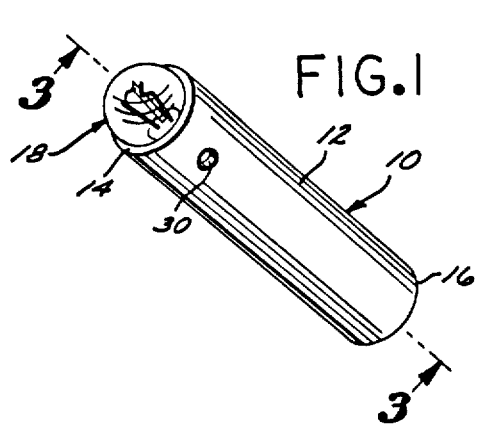
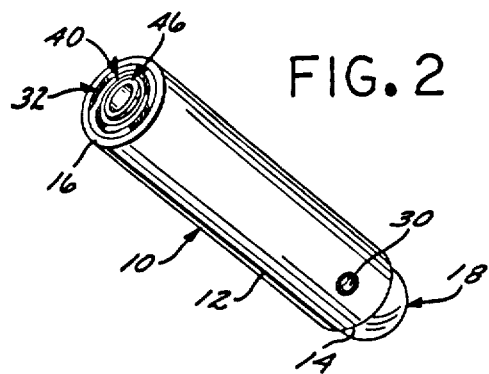
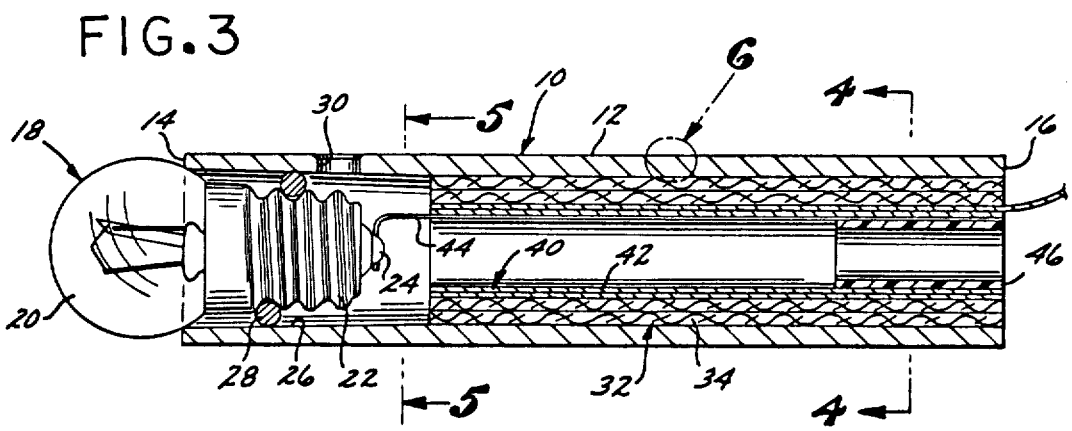
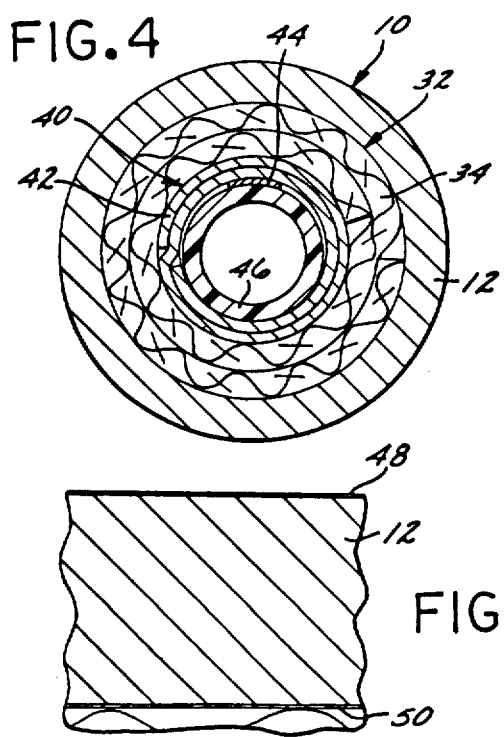
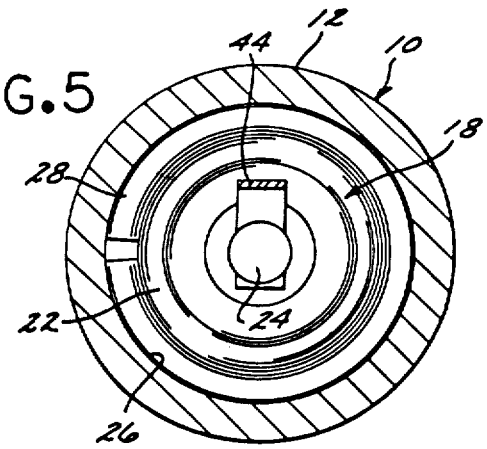

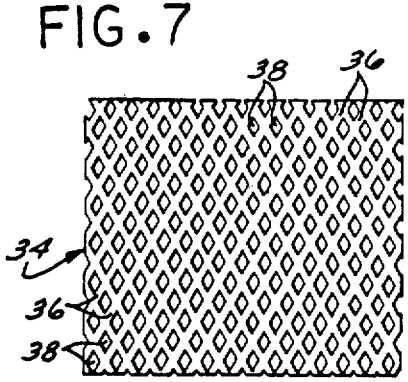
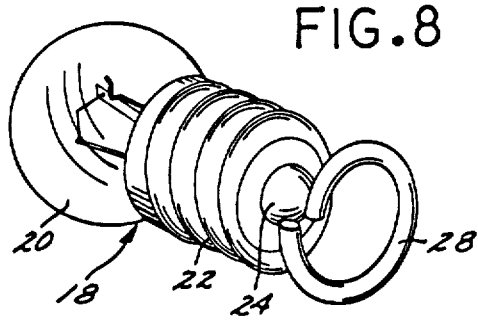
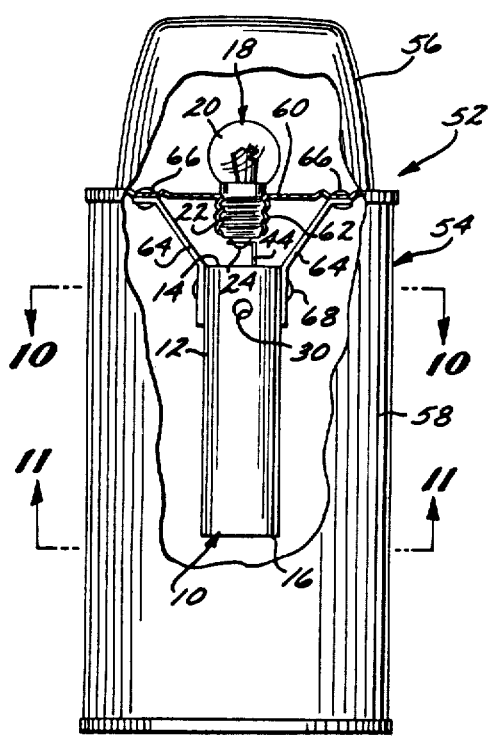
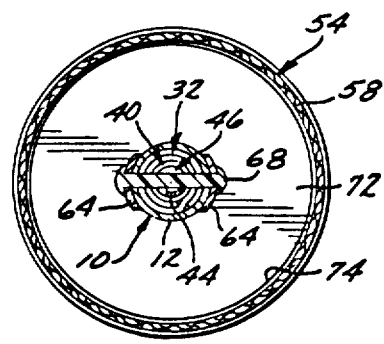
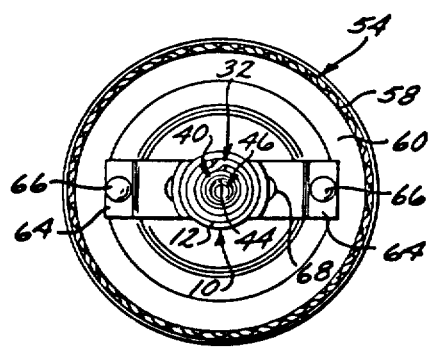
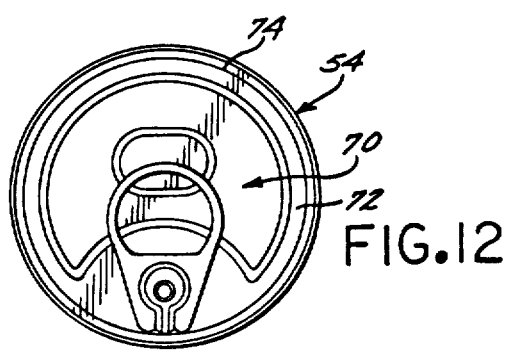

WATER ACTIVATED ELECTRIC CELL AND SURVIVAL LAMP SYSTEM

BACKGROUND OF THE INVENTION

1. Field of the Invention

The invention is in the field of deferred action, water activated electric cells, methods of making them, and survival lamps embodying them.

2. Description of the Prior Art

Deferred action or reserve type electric cells for use as emergency or survival equipment utilizing a magnesium anode and a silver halide cathode, and adapted for activation by the addition of an aqueous fluid, have been known in the art for some time. Magnesium is a preferred anode material for such deferred action cells because it is high in the electromotive series, has good structural strength yet is light in weight, is easy to form, and is readily available. However, magnesium is very active chemically, and therefore readily corrodes from handling, from exposure to the atmosphere and particularly the damp, salty atmosphere of a marine environment where survival equipment is commonly used, and from proximity to some chemicals and in particular chemical salts employed in an electrolyte solution for the cell.

Primarily because of this problem of corrosion of the magnesium anode, prior art deferred action electric cells adapted for emergency or survival use have not included any electrolyte material therein, either in dried form or as a liquid solution, and accordingly in order to activate such cells it was necessary to add a whole or complete electrolyte solution thereto. This generally restricted such deferred action cells to usage in connection with ocean survival equipment, wherein the salt water provided the necessary whole electrolyte required for activation. Such usage of sea water as the electrolyte resulted in less than optimum activation because sea water is not a saturated salt solution. Also, such salt water activated cells were generally complicated physically by the need for controlled entrance passages, fluid flow separators, chambers to accommodate an accumulation of flake-off from the magnesium anode, and the like.

Example of prior patents disclosing such deferred action electric cells embodying magnesium anodes and silver halide cathodes which require the addition of a whole or complete electrolyte, and which are accordingly generally restricted to use in a salt water environment, are the following U.S. Pat. Nos.:

Warner et al: 2,663,749
Lockwood: 2,896,067
Armitage: 3,326,724

While both the Warner U.S. Pat. No. 2,663,749 and the Armitage U.S. Pat. No. 3,326,724 suggest that fresh water could be used as the electrolyte, and in this connection the Armitage patent suggests the electrolyte can be formed of water along with the reaction product salts from the electrolytic action, nevertheless, fresh water is an exceedingly poor electrolyte, and if it is the only electrolyte added for activating the cell, activation will be much too slow, and the resulting current capability of the cell much too low, for reliable and satisfactory operation of the cell in emergency or survival equipment.

Because the corrosiveness of the magnesium anode material has in the past tended to make deferred action electric cells generally unreliable after an extended shelf life, and therefore generally inadequate for use in emergency or survival equipment, there have been prior art attempts to provide a satisfactory corrosion-resistant coating on the magnesium. However, heretofore the procedures and chemical actions required to produce such corrosion-resistant coatings on the magnesium have been so complex, time-consuming and expensive that they have not been generally satisfactory. The Warner et al U.S. Pat. No. 2,663,749 referred to above describes one such magnesium coating procedure; and the Gruber et al U.S. Pat. No. 3,303,054 describes another complex magnesium coating procedure which is employed in the manufacture of "dry cells" which are not of the delayed action type and therefore have a limited shelf life and reliability not suitable for survival equipment.

SUMMARY OF THE INVENTION

In view of these and other problems in the art, it is an object of the present invention to provide a novel deferred action electric cell of the type embodying a magnesium anode and a silver halide cathode, which includes dried electrolyte material supported intermediate the electrodes, whereby any aqueous fluid, which can be fresh or even distilled water, added to the cell will immediately develop the full electrical output potential of the cell.

Another object of the invention is to provide a novel method of coating the magnesium anode of a water-activated deferred action electric cell, wherein a detergent bath produces a coating on the anode that prevents corrosive deterioration of the magnesium from the atmosphere, even in marine areas, from handling, and more particuarly from close proximity of the anode to a dried, water soluble electrolyte material, thereby enabling provision of a complete deferred action electric cell of the character described that contains electrolyte and requires only the addition of water for reliable, immediate and full voltage activation after an extended shelf life.

Another object of the invention is to provide a deferred action electric cell of the character described having a novel mechanical construction embodying the coated magnesium anode as a tubular outer body or shell, the silver halide cathode, preferably silver chloride, in the form of a rolled sheet thereof disposed concentrically within the anode tube, and a rolled sheet of resilient, porous, absorbent insulation material saturated with dried electrolyte disposed in resilient biasing engagement between the anode and cathode for secure relative positioning thereof and intimate dielectric contact therebetween; the porosity of this dried electrolyte-supporting insulation material preferably including perforations extending through the sheet of material for improved ion exchange characteristics and as receptacles for magnesium hydroxide flakes coming off of the anode.

A further object of the invention is to provide a deferred action electric cell of the character described which includes a novel means for releasably supporting a light bulb in one end of the cell, wherein the cell includes a tubular outer magnesium anode shell having an outwardly flaring tapered inner surface in the bulb-receiving end; the bulb having a tapered, externally threaded base portion forming one electrical terminal thereof; and a deformable lock thread element loosely threadedly engaged on the base of the bulb proximate its free end; whereby the base of the bulb with the lock thread element thereon may be pushed down into the tapered bore of the magnesium body and the bulb screwed further into the lock thread element to provide tight wedging engagement with good electrical contact between the base of the bulb, lock thread element and anode body of the cell.

A further object of the invention is to provide a survival or emergency lamp embodying a deferred action electric cell of the character described, wherein the tubular magnesium anode is utilized as the body of the lamp, with a light bulb seated in one end thereof and the other end open for introduction of an aqueous fluid of any character for substantially instantaneous activation thereof after a prolonged shelf life.

A still further object of the invention is to provide another form of survival or emergency lamp embodying a deferred action electrical cell of the character described, which is adapted to be dropped into a body of water as a floating signal light, wherein the deferred action cell is sealed inside of a can-like cylindrical container having a light-transmitting dome at the top with a light bulb that is electrically connected to the cell exposed in such dome, and with the bottom of the container adapted to be torn out along a tear or score line to expose the cell prior to dropping the unit into the water.

A more general object of the invention is to provide a novel deferred action electric cell of the character described which is simple in construction, easy to assemble, attractive in appearance, compact, generally self-contained having dried electrolyte material embodied therein so as to require only the addition of water for activation, and having a prolonged shelf life without substantial deterioration.

Further objects and advantages of the present invention will appear during the course of the following part of the specification, wherein the details of construction, mode of operation and novel method steps of a presently preferred embodiment are described with reference to the accompanying drawings, in which:

BRIEF DESCRIPTION OF THE DRAWINGS

FIG. 1 is a perspective view illustrating a deferred action electric cell according to the invention, the cell embodying a light bulb so that the unit constitutes a survival or emergency lamp.

FIG. 2 is another perspective view showing the deferred action electric cell of FIG. 1.

FIG. 3 is an enlarged axial section taken on the line 3—3 in FIG. 1, with portions shown in elevation, showing internal details of construction of the cell.

FIG. 4 is a still further enlarged transverse section taken on the line 4—4 in FIG. 3.

FIG. 5 is a transverse section similar to FIG. 4 but taken on the line 5—5 in FIG. 3.

FIG. 6 is a greatly enlarged, fragmentary axial section of the region designated 6 in FIG. 3.

FIG. 7 is a plan view illustrating a presently preferred sheet of resilient, porous, perforated, absorbent insulation material employed in the invention as a support medium for the dried electrolyte material.

FIG. 8 is an exploded perspective view illustrating a light bulb and lock thread element employed in the invention.

FIG. 9 is an elevational view, with portions broken away, and portions shown in vertical section, illustrating a survival or emergency lamp embodying the present invention, which is adapted to be dropped into a body of water as a floating signal light.

FIG. 10 is a horizontal section taken on the line 10—10 in FIG. 9.

FIG. 11 is a horizontal section similar to FIG. 10, but taken on the line 11—11 in FIG. 9.

FIG. 12 is a bottom plan view of the survival or emergency lamp illustrated in FIG. 9.

DETAILED DESCRIPTION

Referring to the drawings, and at first to FIGS. 1 to 8 thereof, a presently preferred form of deferred action electric cell according to the invention is generally designated 10, and includes a cylindrical shell composed of magnesium which serves as both the body and the anode of the cell. The magnesium may be any magnesium alloy conventionally employed in deferred action or other primary electric cells. An example of a suitable magnesium alloy, which is given by way of example only, and not of limitation, is AZ31B magnesium.

While the magnesium shell 12 of the deferred action cell 10 may be of any desired dimensions within the scope of the invention, a size which has been found practical in test cells, for compactness, adequate anode area for good current capacity, and for engagement of a light bulb of conventional dimensions and lock thread element in one end according to the invention, is magnesium tubing of 0.070 inch wall thickness having an ID approximately ½ inch, with a length of approximately 2¼ inches. The cell as shown in FIGS. 1 and 2 is slightly larger than the actual size of such test units, while the cell as shown in FIG. 3 is slightly larger than twice the actual size of such test units.

The cylindrical anode shell 12 has a front or terminal end 14, and a rear or water inlet end 16. While a deferred action electric cell 10 according to the invention can be utilized for any purpose, it is particularly useful as a survival or emergency lamp, and in a compact form of such lamp a light bulb generally designated 18 is seated directly in the front or terminal end 14 of the anode shell 12 as best shown in FIGS. 1 and 3. The light bulb 18 includes a generally spherical glass portion 20 that is larger than the ID of the shell 12 at its front end 14 so that the glass portion 20 of the bulb will seat in the front end 14 of the shell but will for the most part project outwardly from the shell to provide good illumination when energized.

The light bulb 18 also includes an outer terminal 22 in the form of a threaded, tapered base having its smallest diameter proximate its free end, the bulb having a center terminal 24 projecting outwardly from the free end of the base 22. The anode shell 12 is provided with a forwardly and outwardly flaring inside surface 26 opening at the front end 14, which is employed in cooperation with the generally complementary tapering of the light bulb base 22 and an intermediate lock thread element 28 for rapid and secure assembly of the light bulb 18 in the front end portion of the anode shell 12. The lock thread element 28 is preferably a single wire loop as best shown in FIG. 8, and it is slightly larger in diameter than the last turn of the thread groove proximate the free end of the threaded base 22 of the bulb. The lock thread element 28 is loosely threadedly engaged onto the threaded base 22 proximate the free end of the latter, and generally in the last turn of the thread groove thereof, and then the base 22 of the bulb with the thread element 28 thereon is pushed down into the internally tapered front end portion of the anode shell 12 until the thread element 28 frictionally seats against the tapered inner surface 26 of the shell. This leaves the glass portion 20 of the bulb still spaced outwardly from the front end 14 of the shell 12. The glass portion 20 is then grasped and rotated so as to screw the light bulb 18 down into the fully seated position illustrated in FIGS. 1 and 3 of the drawings, wherein the glass portion 20 of the bulb seats against the front end 14 of the shell 12. As the bulb is thus screwed into its fully seated position, the lock thread element remains in a generally fixed axial position relative to the shell 12, being wedged against the tapered inner surface 26 thereof, and the external thread groove on the light bulb base 22 will advance in the lock thread element 28, the taper of the threaded base 22 causing increasingly tight wedging engagement of the lock thread element 28 against both the tapered inner shell surface 26 and the tapered threaded base 22, so as to provide good mechanical connection of the light bulb in the front end portion of the shell 12 and also good electrical connection between the outer terminal 22 of the bulb and the anode shell 12.

A hole 30 is provided through the wall of the cylindrical anode shell 12 in the front end portion of the shell but spaced rearwardly from the lock thread element 28. This hole 30 allows entrapped air and reaction gases to escape from the cell if the rear end 16 of the cell is immersed in water to activate the cell.

The cell 10 also includes an electrolyte layer 32 extending from the rear end 16 of the cylindrical shell 12 forwardly to a position somewhat short of the innermost end of light bulb 18, which is the center terminal 24 thereof, and also short of the hole 30. Electrolyte layer 32 is preferably in the form of a rolled sheet 34 of highly absorbent, porous insulation material that has been soaked in a saturated electrolyte solution and dried so as to carry a maximum of dried electrolyte therein. This sheet 34 of absorbent insulation material is rolled, preferably into several layers, after it has been filled with the dry electrolyte, and inserted into the cylindrical anode shell 12 from the rear end 16 thereof.

FIG. 7 illustrates a presently preferred construction of the absorbent sheet 34 which carries the dried electrolyte material, wherein the sheet 34 is of a foraminous or perforated character, being generally net-like with the absorbent web portions 36 and interstitial perforations 38. The web portions 36 are of a highly absorbent, porous, blotter-like consistency, and the material preferably has substantial resiliency in the direction normal to the flat surfaces thereof so that when it is rolled and in operative position within the cylindrical anode shell 12 it will assert a radial biasing effect between the inner and outer electrodes. A suitable perforated, resilient, absorbent insulation material for the sheet 34 is sold commercially as "Handi-Wipe".

The presently preferred electrolyte is an aqueous sodium chloride solution. The porous sheet 34 is immersed in a fully saturated water solution of sodium chloride, generally with an excess of the salt therein to assure saturation, and preferably at a solution temperature in the range of from about 100° F. to about 150° F., and then with the sheet 34 loaded with the solution, it is laid out on a flat, non-absorbent surface and dried. This leaves the absorbent web portions 36 of the sheet loaded with the dried salt, and also provides a considerable amount of dried salt in the interstitial perforations 38.

The highly absorbent nature of the sheet 34 causes the rolled sheet 34 operatively disposed in the cell 10 as best shown in FIGS. 3 and 4 to rapidly draw water through the entire body of the rolled sheet 34 when the rear end edge of the rolled sheet 34 is immersed in water or otherwise exposed to aqueous fluid. As the water is thus rapidly soaked up into the rolled sheet 34, the water dissolves the dried electrolyte therein to "turn on" the cell.

The inerstitial perforations 38 in the sheet 34 provide improved ion exchange characteristics when the cell is in operation, and also serve as receptacles for magnesium hydroxide flakes which tend to come off of the anode during operation of the cell so that such flakes do not seriously interfere with the ion exchange and hence the current flow from the cell.

The cathode is generally designated 40, and is preferably in the form of a rolled sheet 42 of silver halide material. The preferred silver halide is silver chloride, and this cathode material is "developed" according to conventional practice. A presently preferred sheet silver chloride material has a thickness of about 1/32 inch, and two layers of this sheet 42 in the roll thereof that forms the cathode 40, as best shown in FIGS. 3 and 4, will generally be satisfactory. Additional layers of the silver chloride in the roll will provide more operative time for the cell. The current capacity of the cell is determined principally by the amount of surface area of the outer surface of the silver chloride roll in the cell, as well as by the concentration of electrolyte and freedom of ion exchange permitted by the porous absorbent sheet material employed in the electrolyte layer 32. The rolled electrolyte-supporting sheet 34 and the rolled cathode sheet 42 are preferably co-extensive in length as best seen in FIG. 3.

Termination is preferably provided for the cathode 40 by means of a thin strip 44 of conductive material, which is preferably a strip of coined silver for compatability with the silver chloride cathode. The conductor strip 44 is soldered to the center terminal 24 of the light bulb 18, and extends rearwardly through the passage in the rolled, tubular cathode 40, being pressed outwardly into good electrical contact with the cathode 40 by means of a dielectric support tube 46 that is disposed within the rear end portion of the cathode 40.

Assembly of the cell 10 having the aforesaid components is simple and quickly accomplished. First, the cathode sheet 42 is rolled into its cylindrical shape, and then the porous sheet 34 that is impregnated with dried electrolyte is rolled around the tubular cathode, and this combination is pushed into the cylindrical anode shell 12 from the rear end 16 thereof. Next, the light bulb 18, with the lock thread element 28 on its threaded base 22 and with the conductor strip 44 soldered to its center terminal 24, is engaged in the front end portion of the anode shell 12 in the manner heretofore described in detail. As the light bulb 18 is brought toward the front end 14 of the shell 12, the free end portion of the conductor strip 44 is fed through the axial passage defined within the rolled cathode sheet, so that when the light bulb 18 is in its fully seated, attached position as best shown in FIG. 3, the conductor strip 44 will extend all of the way through the axial passage in the rolled cathode sheet 42, with a tail end portion of the conductor strip 44 extending out beyond the rear end 16 of the cell. This exposed free end of the conductor strip 44 is then simply bent over the rear end edge of the unit and held there while the support tube 46 of dielectric material is pushed into the axial passage defined within the rolled cathode sheet 42 from the rear end so as to clamp the conductor strip 44 against the inwardly facing surface of the cathode, as best shown in FIGS. 3 and 4. The exposed tail end of the conductor strip 44 may then be snipped off proximate the rear end of the cell, or a tail end portion of strip 44 may be tucked back forwardly into the inside of the support tube 46.

The rolled sheet 42 of the cathode provides a relatively rigid tubular structure, and it is preferably rolled to an OD such that with the desired number of rolled layers of the electrolyte-containing sheet 34, the sheet 34 will be slightly compressed in the radial direction so that its resiliency will provide a biased engagement between the cathode 40, electrolyte layer 32 and cylindrical anode shell 12.

FIG. 6 illustrates corrosion-inhibiting coatings 48 and 50 on the respective outer and inner surfaces of the magnesium anode shell 12. Actually, the corrosion-inhibiting coating is a continuous coating covering all surface regions of the magnesium anode shell 12. However, the coating portion 48 over the outer surface of the shell 12 is important as a protection against corrosive damage from handling and atmospheric effects; while the coating portion 50 over the inwardly facing surface of shell 12 is important because of the presence of the highly corrosive dried electrolyte, which would otherwise quickly render the inner, operative surface of the magnesium shell into a very poor electrical conductor, or generally non-conductive, which would prevent or seriously diminish operation of the cell. The inner corrosion-inhibiting coating 50 also helps to preserve good electrical contact from the inner surface of the shell 12 to the lock thread element 28, and hence to the outer terminal 22 of the light bulb 18.

The protective coating is provided by immersion of the magnesium shell 12 in a detergent bath consisting of a water detergent solution of controlled concentration, at a controlled temperature, and for a controlled period of time. Extensive tests conducted by the applicant disclose that all detergents in aqueous solution will cause some coating to appear on a magnesium surface. However, the general quality of the coating and the percentage of voids in the coating on a microscopic basis vary widely with different detergents, and also with different concentrations, temperatures and time durations of the treatment.

Because of the availability, the applicant has been required to perform the testing of the present method of producing the corrosion-inhibiting coating on the surface of the magnesium anode with commercial washing detergents. Such detergents all have a variety of additives to assist the detergent action in washing clothes, dishes or the like, or simply for advertising purposes, and such additives generally tend to detract from optimum performance of the detergent to provide the protective coating on the magnesium anode. Such additives include things like oils, fats, enzymes, phosphates, and the like, and even include peanut shells in at least one detergent preparation. Because applicant was required to use such commercial detergents during the performance of tests set forth hereinafter to determine suitable detergent baths, temperatures, and immersion times, the ratings which applicant has applied to the results of such tests as to quality of the coating and percentage of voids in the coating are not considered to be optimum. However, the applicant has found in conducting these tests that some of the commercial detergents do provide a corrosion-inhibiting coating of satisfactory quality and with a sufficiently low percentage of voids on a microscopic basis to be satisfactory for use in deferred action electric cells according to the present invention which contain the dried electrolyte material therein.

It is contemplated for optimum performance of the invention to provide a detergent without any of the usual additives of a commercial detergent so as to eliminate the deleterious effects of such additives during the forming of the corrosion-inhibiting coating on the magnesium anode.

In addition to the tests of various detergents to determine the magnesium coating capability thereof, applicant also attempted to produce similar coatings with the use of soap solutions. However, applicant determined with such tests that immersion of the magnesium anode in a soap solution does not produce any substantial protective coating thereon.

The test examples set forth hereinafter for various detergents were performed on magnesium AZ31B, in 0.030 inch thickness flat stock. Each example has a column designated "Quality of Coating" wherein the quality is rated as follows:

A—Excellent
B—Good
C—Fair
D—Not Desired

These quality ratings were determined in part by viewing the coated surfaces under a 3,000 power microscope, and include a consideration of such quality factors as thickness of the coating, durability of the coating, and amount of voids. It will be noted in the following test examples that with the use of commercial detergents the highest quality rating was B.

Each of the following test examples also has a column entitled "% Voids in Coating". This was determined by an inspection under a 3,000 power microscope, and the percentage figure given for each test is the percentage of the magnesium surface that is not coated on a microscopic basis.

Coatings which are rated A, B or C, and which have a percentage of voids no greater than about 25%, are generally acceptable coatings for use in deferred action electric cells according to the invention.

Generally, magnesium stock that will be employed for the anode of an electric cell according to the present invention will have an oil film coating in its off-the-shelf condition. Such oil coating must be removed from the magnesium in order for the magnesium to have the necessary conductivity for use in an electric cell. The detergent bath of the present invention quickly removes such oil film from the magnesium when the magnesium is first immersed in the bath, thereby cleaning the surface of the magnesium in preparation for the formation of the corrosion-inhibiting coating. Thus, the detergent bath has a two-step function in preparing the magnesium for use as an anode in the present invention.

If the magnesium to be coated has already become corroded or is too dirty, it is preferable to clean it with steel wool before immersing it in the detergent bath to provide the corrosion-inhibiting coating.

In the following test examples for various commercial detergents, a number of separate runs were made for each type of detergent. All of the detergent baths that were prepared employed 32 ounces of water, which in most cases was tap water, but in a few of the tests was distilled water, designated "Dist." in the following examples. The weight of the detergent dissolved in the water, whether it was a liquid detergent or a powdered or granulated type detergent, was measured in grams, and amounts of either 50 or 100 grams of detergent were employed. The temperatures of the detergent baths are given in the examples in degrees Fahrenheit, and these range from a minimum of 70° F. to a maximum of 180° F. The time duration of immersion of the magnesium is given in minutes, and ranges from a minimum of five minutes to a maximum of 120 minutes.

EXAMPLE 1

"FAB"

| Run No. | Vol. Water Oz. | Type Water | Wt. Deterg. Grams | Temp. °F. | Time Min. | Quality of Coating | % Voids Coating |
|---|---|---|---|---|---|---|---|
| 1 | 32 | Tap | 100 | 100 | 30 | D | 45% |
| 2 | 32 | Tap | 100 | 150 | 30 | D | 45% |
| 3 | 32 | Tap | 100 | 180 | 30 | D | 90% |
| 4 | 32 | Tap | 50 | 100 | 30 | D | 30% |
| 5 | 32 | Tap | 50 | 150 | 30 | D | 25% |
| 6 | 32 | Tap | 50 | 180 | 30 | D | 70% |
| 7 | 32 | Tap | 100 | 80 | 30 | C | 5% |
| 8 | 32 | Tap | 100 | 90 | 30 | D | 25% |
| 9 | 32 | Tap | 100 | 180 | 45 | D | 90% |
| 10 | 32 | Tap | 50 | 70 | 60 | C | 2% |
| 11 | 32 | Tap | 50 | 70 | 90 | D | 2% |
| 12 | 32 | Tap | 50 | 70 | 120 | D | 95% |
| 13 | 32 | Dist. | 50 | 150 | 15 | D | 30% |
| 14 | 32 | Dist. | 50 | 150 | 30 | D | 30% |
| 15 | 32 | Dist. | 50 | 150 | 90 | D | 20% |

The coatings produced in runs 7 and 10 in Example 1 were satisfactory corrosion-inhibiting coatings according to the invention. It is to be noted that with "FAB" as the detergent, the best results were achieved at relatively low temperatures, on the order of 70° F. to 80° F. "FAB" is a product of Colgate-Palmolive Co., New York, N.Y. 10022.

EXAMPLE 2

"TIDE"

| Run No. | Vol. Water | Type Water | Wt. Deterg. Grams | Temp. °F. | Time Min. | Quality of Coating | % Voids in Coating |
|---|---|---|---|---|---|---|---|
| 1 | 32 | Tap | 100 | 100 | 30 | D | 30% |
| 2 | 32 | Tap | 100 | 150 | 30 | D | 30% |
| 3 | 32 | Tap | 100 | 180 | 30 | D | 30% |
| 4 | 32 | Tap | 100 | 100 | 15 | B | 1% |
| 5 | 32 | Tap | 100 | 70 | 30 | B | 0% |
| 6 | 32 | Tap | 100 | 80 | 30 | B | 0% |

The coatings produced in Runs 4, 5 and 6 in Example 2 were very good corrosion-inhibiting coatings according to the invention. It is to be that the best results with "Tide" are at low temperatures, on the order of 70° F. to 80° F., but that good results are still obtainable up to about 100° F. if the time is materially reduced. "Tide" is a product of Proctor & Gamble, Cincinnati, Ohio 45202.

"FAB" and "Tide" as used in respective Examples 1 and 2 were powdered detergent products.

EXAMPLE 3

"AJAX"

| Run. No. | Vol. Water Oz. | Type Water | Wt. Deterg. Grams | Temp. °F. | Time Min. | Quality of Coating | % Voids in Coating |
|---|---|---|---|---|---|---|---|
| 1 | 32 | Tap | 50 | 130 | 15 | B | 0% |
| 2 | 32 | Tap | 50 | 150 | 15 | B | 1-2% |
| 3 | 32 | Tap | 50 | 150 | 30 | B | 3-4% |

The "Ajax" detergent employed in Example 3 was a liquid dishwashing detergent. All three of the runs made with "Ajax" detergent provided very good corrosion-inhibiting coatings on the magnesium anode material, with Run No. 1 producing the best of these three coatings. It is to be noted that good coatings are produced with "Ajax" liquid dishwashing detergent at relatively high temperatures (130° F. to 150° F.) as compared with the temperatures that produce the best coatings with "FAB" and "Tide" (70° F. to 80° F.). "Ajax" liquid dishwashing detergent is a product of Colgate-Palmolive Co., New York, N.Y. 10022.

EXAMPLE 4

"AXION"

| Run No. | Vol. Water Oz. | Type Water | Wt. Deterg. Grams | Temp. °F. | Time Min. | Quality of Coating | % Voids in Coating |
|---|---|---|---|---|---|---|---|
| 1 | 32 | Tap | 100 | 100 | 30 | D | 5% |
| 2 | 32 | Tap | 50 | 100 | 30 | D | 50% |
| 3 | 32 | Tap | 100 | 150 | 30 | D | 35% |
| 4 | 32 | Tap | 50 | 150 | 30 | C | 20% |
| 5 | 32 | Tap | 100 | 180 | 30 | D | 25% |
| 6 | 32 | Tap | 50 | 180 | 15 | C | 10% |
| 7 | 32 | Dist. | 100 | 100 | 15 | D | 25% |
| 8 | 32 | Dist. | 100 | 100 | 30 | D | 40% |

The coating produced in Runs 4 and 6 in Example 4 were satisfactory corrosion-inhibiting coatings according to the invention, although not as good as the coatings produced in some of the runs in Examples 1, 2 and 3. It is noted that "Axion" requires relatively high temperatures for a fair quality coating (150° F. to 180° F.). "Axion" is a product of Colgate-Palmolive Co., New York, N.Y. 10022.

EXAMPLE 5

"DASH"

| Run No. | Vol. Water Oz. | Type Water | Wt. Deterg. Grams. | Temp. °F. | Time Min. | Quality of Coating | % Voids in Coating |
|---|---|---|---|---|---|---|---|
| 1 | 32 | Tap | 100 | 100 | 30 | D | 50% |
| 2 | 32 | Tap | 50 | 100 | 30 | D | 50% |
| 3 | 32 | Tap | 100 | 150 | 30 | D | 30% |
| 4 | 32 | Tap | 50 | 150 | 30 | C | 20% |
| 5 | 32 | Tap | 100 | 180 | 30 | C | 10% |
| 6 | 32 | Tap | 100 | 180 | 15 | D | 20% |

The coatings produced in Runs 4 and 5 in Example 5 were satisfactory corrosion-inhibiting coatings according to the invention. It is to be noted that relatively high temperature (150° F. to 180° F.) were required. It is also interesting to note that a reduction in the concentration of detergent at 150° F. produced a better coating. "Dash" is a product of Proctor & Gamble, Cincinnati, Ohio 45202.

EXAMPLE 6

"ALL"

| Run No. | Vol. Water Oz. | Type Water | Wt. Deterg. Grams | Temp. °F. | Time Min. | Quality of Coating | % Voids in Coating |
|---|---|---|---|---|---|---|---|
| 1 | 32 | Tap | 100 | 100 | 30 | C | 5% |
| 2 | 32 | Tap | 100 | 150 | 30 | B | 5% |
| 3 | 32 | Tap | 100 | 180 | 30 | D | 40% |
| 4 | 32 | Tap | 50 | 100 | 30 | D | 35% |
| 5 | 32 | Tap | 50 | 150 | 30 | C | 10% |
| 6 | 32 | Tap | 50 | 180 | 30 | D | 15% |

Runs 1, 2 and 5 in Example 6 produced satisfactory corrosion-inhibiting coatings according to the invention. It is to be noted that good results were produced at both 100° F. and 150° F., but the amount of detergent could be reduced at the higher temperature. "All" is a product of Lever Brothers, New York, N.Y. 10022.

Examples 4, 5 and 6, for "Axion", "Dash" and "All", respectively, involved the use of powdered detergents.

EXAMPLE 7

"PERFORM"

| Run No. | Vol. Water Oz. | Type Water | Wt. Deterg. Grams | Temp. °F. | Time Min. | Quality of Coating | % Voids of Coating |
|---|---|---|---|---|---|---|---|
| 1 | 32 | Tap | 100 | 100 | 15 | D | 90% |
| 2 | 32 | Tap | 100 | 100 | 30 | D | 90% |
| 3 | 32 | Tap | 100 | 150 | 15 | D | 90% |
| 4 | 32 | Tap | 100 | 150 | 30 | D | 90% |
| 5 | 32 | Tap | 100 | 180 | 15 | D | 90% |
| 6 | 32 | Tap | 100 | 180 | 30 | C | 5% |

The coating produced in Run 6 in Example 7 was a satisfactory corrosion-inhibiting coating according to the invention. The "Perform" used was a liquid detergent product manufactured by Paramount Chemical Corp., Montebello, Calif. 90640. It is to be noted that "Perform" required a high temperature (180° F.) and substantial time (30 minutes) to provide such satisfactory coating.

EXAMPLE 8

"SPRINGFIELD"

| Run No. | Vol. Water Oz. | Type Water | Wt. Deterg. Grams | Temp. °F. | Time Min. | Quality of Coating | % Voids of Coating |
|---|---|---|---|---|---|---|---|
| 1 | 32 | Tap | 100 | 100 | 30 | C | 2% |
| 2 | 32 | Tap | 100 | 150 | 5 | C | 2% |
| 3 | 32 | Tap | 100 | 180 | 7 | D | 15% |
| 4 | 32 | Tap | 50 | 100 | 40 | C-B | 0% |

The coating produced in Runs 1, 2 and 4 in Example 8 were satisfactory corrosion-inhibiting coatings according to the invention. It is to be noted that "Springfield" works satisfactorily at relatively low temperature (100° F.) and also relatively high temperature (150° F.). "Springfield" is a product of Certified Grocers, Los Angeles, Calif. 90022. This was a powdered detergent product.

EXAMPLE 9

"LAMWAY SA8"

| Run No. | Vol. Water Oz. | Type Water | Wt. Deterg. Grams | Temp. °F. | Time Min. | Quality of Coating | % Voids of Coating |
|---|---|---|---|---|---|---|---|
| 1 | 32 | Tap | 100 | 80 | 30 | D | 100% |
| 2 | 32 | Tap | 100 | 80 | 60 | D | 100% |
| 3 | 32 | Tap | 100 | 80 | 120 | D | 80% |
| 4 | 32 | Tap | 100 | 150 | 15 | D | 95% |
| 5 | 32 | Tap | 100 | 150 | 30 | D | 95% |

None of the coatings produced in the test runs made on "Amway SA8" were satisfactory corrosion-inhibiting coatings according to the present invention, regardless of wide variations in times and temperatures. This was a powdered detergent.

It will be apparent from the foregoing examples that the various commercial detergents differ widely in their ability to provide satisfactory corrosion-inhibiting coatings on magnesium, and in the bath temperatures and immersion times required to provide satisfactory coatings. A general observation is that with an increase in the bath temperatures, the dwell time of the immersion can be generally reduced.

These corrosion-inhibiting coatings produced by immersion of the magnesium anode material in suitable detergent baths do not materially diminish the surface conductivity of the magnesium in the coated area, despite the greatly reduced chemical activity of the exposed surfaces. Thus, in providing the novel coating according to the present invention, the electrical conductivity of the anode material is not only preserved at the time of coating, but is preserved by the coating over a prolonged shelf life period, which may be on the order of a number of years.

Referring now particularly to FIGS. 9 to 12 of the drawings, these figures illustrate a survival lamp unit generally designated 52 which is adapted to be dropped into a body of water as a floating signal light. This survival lamp unit 52 comprises generally a cylindrical can-like container 54 having a light transmitting dome 56 of transparent or translucent material, preferably plastic, projecting upwardly from the upper end of the cylindrical container 54. The container 54, although of any can-like construction, is preferably similar to the conventional frozen juice can, and includes a cylindrical shell 58. A top wall disc 60 is peripherally crimped to the upper end of the cylindrical shell 58, and has a threaded socket 62 centrally formed therein. The socket 62 preferably projects downwardly from the generally planar surface of the top wall disc 60, and is adapted to threadedly receive therein the outer terminal 22 of light bulb 18. This positions the glass portion 20 of light bulb 18 above the top wall disc 60 and within the light transmitting dome 56, so that light radiated from the bulb 18 will be transmitted through the dome 56 both directly from the bulb and by reflection off of the upper surface of the disc 60 which is preferably a reflective metal surface.

A pair of bracket arms 64 are connected to disc 60 by rivets 66 or other suitable means, the arm 64 extending downwardly to spaced lower end portions that are engaged in diametrically opposed relationship against opposite sides of the upper end portion of cylindrical shell 12, shell 12 being secured in this position by means of a non-conducting rivet 68 extending transversely through the bracket arm 64 and shell 12. By this means the deferred action cell 10 is suspended centrally within the cylindrical container 54, in generally coaxial relationship, with the front end 14 of the cell disposed immediately below and adjacent to the light bulb 18, and the rear end 16 of the cell disposed generally in a lower portion of the container 54. The outer terminal 22 of light bulb 18 is electrically connected through threaded socket 62, top wall disc 60 and metal bracket arms 64 to the anode shell 12 of the electrical cell 10. The center terminal 24 of the light bulb 18 is electrically connected through the conductor strip 44 in the manner heretofore described in connection with FIGS. 3 to 5 of the drawings to the cathode 40 of the cell 10. By providing the rivet 68 of non-conductive material, there is no danger of short-circuiting the cathode conductor 44 to anode shell 12.

While a single deferred action electric cell 10 is shown centrally disposed in the cylindrical container 54, it is to be understood that if desired a plurality of such cells 10 may be arranged in side-by-side relationship within the container 54 if it is desired to extend the operational time of the lamp.

A metal bottom wall 70 is peripherally crimped to the bottom edge of the cylindrical shell 58 so as to provide a hermetically sealed cavity inside of the cylindrical container 54 for maximum shelf life of the entire unit, and particularly of the deferred action electric cell 10 therein. This bottom wall 70 has a removable disc portion 72 thereof comprising substantially the entire bottom wall. The removable disc portion 72 is defined by a tear line or score line 74, and a pull tab 76 attached to the removable disc portion 72 provides a means for tearing out substantially the entire bottom wall of the container 54.

While the top wall disc 60 may not provide a hermetic seal for the region of the cell 10, the peripheral portion of the top wall 60 is sealed to the upper edge of the cylindrical shell 58, and the lower edge of light transmitting dome 56 is sealed to the peripheral part of top wall 60, as by heat sealing or other suitable means, to provide the hermetic seal at the upper end of the container 54.

Despite the extended shelf life of the survival lamp unit 52, the unit is ready for virtually instantaneous operation by simply grasping the pull tab 76 and ripping out the removable disc portion 72 to substantially completely open up the lower end of the cylindrical shell 58. Then the unit is simply tossed into the water, and the water will freely enter the open lower end causing the lower end to drop down into the water, and air captured in the upper portion will cause the unit to float in its upright position with the light transmitting dome 56 above the water. In this position the rear end 16 of the cell 10 will be immersed in the water, causing almost instantaneous activation of the cell and illumination of the light bulb 18.

To assure that the unit 52 will float at the desired level and in an upright position, it is preferred to provide a hole 78 through the upper portion of the cylindrical shell 58 that is spaced downwardly from the top wall 60 and normally sealed by a plug or cover member 80 that is removable from the hole 78 from the inside. Such sealing means 80 is connected to the removable bottom disc portion 72 by a suitable link member 82 so that when the disc portion 72 is torn out to prepare the unit for use, the sealing means 80 will be automatically removed from the hole 78. This relieves excess gas, both air and reaction gas from below the hole 78, but provides a flotation chamber having gas therein above the hole 78 for stabilized flotation of the unit at a controlled level.

While the present invention has been shown and described herein in what are conceived to be the most practical and preferred embodiments, it is recognized that departures may be made therefrom within the scope of the invention, which is therefore not to be limited to the details disclosed herein.

I claim:

1. A survival lamp which comprises a hermetically sealed, generally cylindrical container having top and bottom walls, light bulb means mounted on said top wall and having an illuminating portion exposed to radiate light above said top wall, and a water-activated, deferred action electric cell supported within said container, said cell having an upper terminal portion electrically connected to said light bulb means and an open lower end portion to admit activating water therein, said bottom wall having a tear-out section constituting a major portion of the lower end portion which is adapted to be torn out so as to open the hermatically sealed container and freely admit water through said bottom wall,
    wherein said cell further comprises first and second electrodes having spaced, opposed, surface portions, and porous water-absorbent electrical insulation material impregnated with dried water-soluble electrolyte material disposed between and in contact with said surface portions, a portion of said insulation material being exposed from between said surface portions for application of aqueous fluid thereto activate the cell;
    said first electrode being composed principally of magnesium and having an electrically conductive, corrosion-inhibiting coating composed principally of detergent covering at least said surface portion thereof.

2. A deferred action electric cell as defined in claim 1, wherein said first electrode is substantially completely covered by said electrically conductive, corrosion-inhibiting coating.

3. A survival lamp as defined in claim 1, wherein said tear-out section constitutes substantially the entire said bottom wall.

4. A survival lamp as defined in claim 1, wherein said container has a hole through the upper portion of the wall thereof spaced downwardly from said top wall so as to relieve excess gas from the inside of the container below the hole but provide a flotation chamber having gas therein above the hole for stabilized flotation of the lamp at a controlled level, removable closure means normally sealing said hole, and link means connecting said closure means to said tear-out section of said bottom wall so that said closure means will be automatically removed to open said hole when said tear-out section is removed.

5. A deferred action electric cell as defined in claim 1, wherein said second electrode is composed principally of silver halide, and said electrolyte material is composed principally of halide salt.

6. A deferred action electric cell as defined in claim 5, wherein said second electrode is composed principally of silver chloride and said electrolyte material is composed principally of sodium chloride.

7. A deferred action electric cell as defined in claim 1, wherein said first electrode is a generally cylindrical shell, said second electrode is composed of silver halide and is generally cylindrical, being substantially concentrically disposed within said first electrode, and said insulation material is a generally cylindrical body disposed generally concentrically between said first and second electrodes, said electrolyte material being composed principally of halide salt.

8. A deferred action electric cell as defined in claim 7, wherein said insulation material body is resilient and asserts a radial biasing effect between said electrodes.

9. A deferred action electric cell as defined in claim 7, wherein said second electrode comprises a rolled sheet of material composed principally of silver halide.

10. A deferred action electric cell as defined in claim 7, wherein said insulation material comprises a rolled, perforated sheet having web portions of absorbent, porous, blotter-like consistency, with interstitial perforations between said web portions.

11. A deferred action electric cell as defined in claim 7, wherein said shell has an open rear end exposing said insulation material for application of aqueous fluid thereto to activate the cell, and said shell has a forward portion extending forwardly of the forwardmost extent of said insulation material and said second electrode, said forward portion of the shell constituting anode terminal means.

12. A deferred action electric cell as defined in claim 11, which includes an elongated electrical conductor connected to said second electrode and extending forwardly into said forward portion of the shell, said conductor constituting cathode terminal means.

13. A deferred action electric cell as defined in claim 12, wherein said conductor is clamped against the inside surface of said second electrode by a support tube of insulation material disposed within said second electrode.

14. A deferred action electric cell as defined in claim 12, which said light bulb means includes a light bulb disposed in said forward portion of the shell, said light bulb having an illuminating portion exposed forwardly of the shell and having a base extending into said forward portion of the shell, said base including outer and center light bulb terminals, first electrical connection means between said outer light bulb terminal and said anode terminal means, and second electrical connection means between said inner light bulb terminal and said cathode terminal means.

15. A deferred action electric cell as defined in claim 14, wherein said forward shell portion has a forwardly and outwardly flaring internal taper, and said outer light bulb terminal is threaded and is externally tapered in generally complementary relationship to said internal taper, said first electrical connection means comprising a lock thread element threadedly engaged on said outer light bulb terminal and wedged against said internal taper to provide both electrical connection and mechanical retention of the light bulb in the shell.

16. A deferred action electric cell as defined in claim 15, wherein said shell has a hole through the wall of said forward portion thereof rearwardly of said lock thread element.

* * * * *